J. A. ANGLADA.
CONVERTIBLE AUTOMOBILE BODY.
APPLICATION FILED OCT. 17, 1916.

1,233,957.

Patented July 17, 1917.
2 SHEETS—SHEET 1.

1,233,957.

Witnesses;
John H. Curtz
H. McLemore

UNITED STATES PATENT OFFICE.

JOSEPH A. ANGLADA, OF NEW YORK, N. Y., ASSIGNOR TO THE ROCK HILL BUGGY COMPANY, OF ROCK HILL, SOUTH CAROLINA, A CORPORATION OF SOUTH CAROLINA.

CONVERTIBLE AUTOMOBILE-BODY.

1,233,957.

Specification of Letters Patent. Patented July 17, 1917.

Application filed October 17, 1916. Serial No. 126,075.

*To all whom it may concern:*

Be it known that I, JOSEPH A. ANGLADA, a citizen of the United States, residing in the borough of Manhattan, city, county, and State of New York, have invented certain new and useful Improvements in Convertible Automobile-Bodies, of which the following is a specification, reference being had to the accompanying drawings, illustrative of one particular embodiment of my invention.

My invention relates to the construction of bodies suitable for automobiles or like purposes, which are generally termed "convertible", that is, the body may be readily transformed to accommodate a more or less number of people. In particular my invention aims to provide a body of this character which will have a roomy rear seat affording the many desired advantages, and particularly one which will be readily accessible from the forward seats and which also affords facility for quick and effective conversion, and among the other objects, affords a convenient and relative roomy storage space in the rear when "closed", with such storage space readily accessible and amply protected.

While my invention may be variously embodied, a particular form which I will herein specifically describe, is shown in the accompanying drawings in which.

Figure 1:
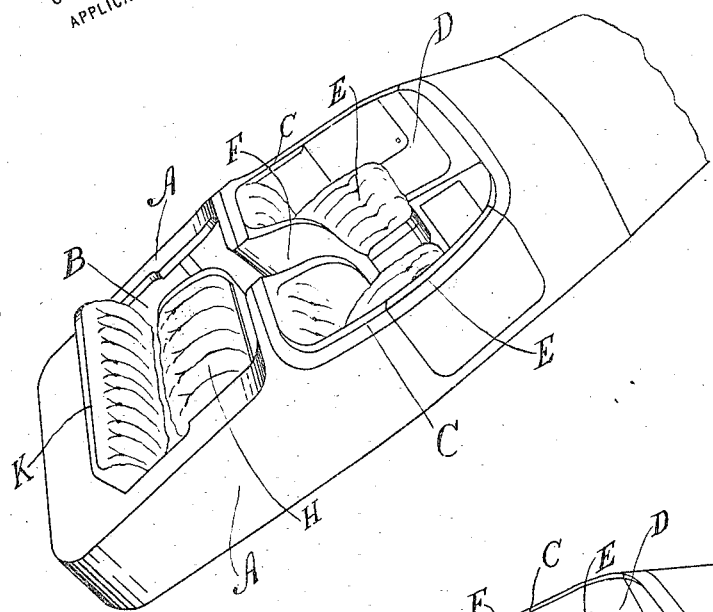
Figure 1 is a perspective view of a body when "open".

In the drawings, the body walls A form the sides of the rear space B, and these walls extend forward at C—C inclosing the front space D. In the front space D there are two permanent seats E, with a passageway F between them, and as shown a door G hinged at the bottom, lies in this passageway on the floor, or may be raised up as indicated in dotted lines to the position G', in Fig. 3, so as to close the passage from the front space to the rear space.

Figure 2:
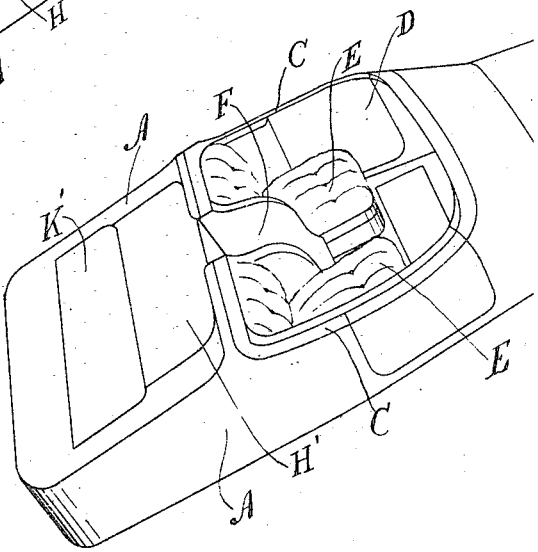
Fig. 2 is a perspective view showing the same body "closed".
Figure 3:
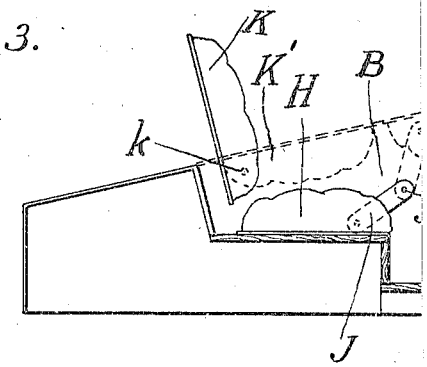
Fig. 3 is a vertical section taken longitudinally of the body with the convertible seats shown in "open" position, and showing their "closed" position in dotted lines.
Figure 4:
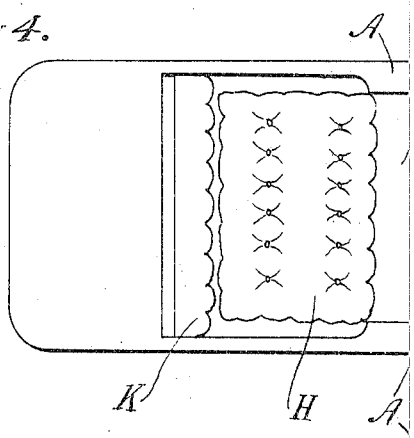
Fig. 4 is a plan view of the body.

In the rear space, a seat H, practically the width of the space, is supported by straps J, which are pivoted at j in the sides of the body, so that the seat may be pivoted around j by lifting it up and turning it over to the position H' shown in Fig. 3, and the outside view Fig. 2. The seat back K, is in the desired position with respect to the seat H to afford a comfortable, broad rear seat for the body, but when not in use this is pivoted about pivot k into the position K', thereby covering the rear portion of the rear space B, when the back of the seat is not in use.

The base or back of the two upholstered sections H and K, are so finished as to form a substantial deck or cover when turned into the position shown in Fig. 2, called the "closed" position, and the edges of these backs are so arranged that they will overlap in a suitable manner to make the covering weather-proof. When "closed" the door G is turned up so that the space back of the front seat is entirely inclosed and anything stored therein is completely protected from the weather.

By combining the convertible seat and back in the rear space, with the divided seat in the front space, there is access to the rear space when "closed," without opening up the top, so that articles may be passed between the front seats into the space for storing. By my invention the seat and back when not in use do not occupy any space, but on the contrary are shifted to a position whereby the lower or floor portion of the rear space becomes entirely available for the storage of articles. At the same time when in "open" position the divided front seat affords access from rear to front space without going out of the car and thereby adds greatly to the convenience of the user.

Figure 5:
Fig. 5 is a plan view similar to Fig. 4 with certain detailed modifications.

Instead of a large downward-folding door, a double small door may be used, as shown in Fig. 5, at L—L, the two parts being so hinged as to fold back against the sides of the passage-way F.

In the particular form shown the length of the seat section is less than the length of the back section, of the convertible seat. As this lends itself admirable to this particular construction, various modifications, however, may be made in this respect, and also in respect to other features of the construction, and the various elements forming the combination of my invention may all b used together in one body, or some of them may be omitted and only certain of the elements in advantageous combination may be employed in other forms of my construction.

Instead of a passage-way between the front seats, it may in certain constructions be preferable to put the passage-way at one side, or likewise it may be convenient to have some access from the side to the inclosed rear storage space, that is the rear space when the seat and back are in closed position. These and various other modifications may be made without departing from the spirit of my invention, but what I claim and desire to secure by Letters Patent is:

1. A convertible body comprising two front seats, a passage between said front seats, a rear space inclosed on three sides by permanent walls and on the front by the backs of the front seats, a transversely pivoted rear seat accessible through said passage, a shiftable back for and independent of said rear seat, independent means of articulation for said rear seat and said back whereby the bases of each when in closed position constitute a complete closure or deck for the rear of the body.

2. An automobile body comprising front seats, a rear seating space, a passage-way from the front seats to the rear seating space, a two-part convertible deck or top adapted to completely cover said rear seating space and extending rearwardly from and below the top of the back of the front seats, means within said seating space to independently support said two parts of the cover in shifted position to afford a seat and back respectively, for passengers in said rear seating space.

3. In an automobile body, a front seating space and rear seating space, a fixed seat in the front space, a passage leading beside said fixed seat to the rear seating space, convertible seats in the rear space and means of articulation within said space for said convertible seats, whereby in shifted position they constitute a complete deck for the rear seating space, and a weatherproof door to close the passage-way from the front seating space to the rear seating space when in closed or decked position.

4. In a vehicle body, two seating spaces, a fixed seat in one of said spaces and a passage-way beside that seat leading to the other seating space, permanent walls about three sides of the latter, articulated members in said second seating space and means to support said members whereby in one position they constitute respectively, a seat and back, and in another position they constitute a top cover for said seating space extending contiguous from the rear of the front seat backs, for the purpose described.

5. In a vehicle body, front and rear seating spaces of substantially equal width, permanent sides around one of said seating spaces, a side door for the other seating space and a passage-way between the two seating spaces, a solid closure for said passageway and a complete closure for the first mentioned seating space including two independently shiftable members to constitute, respectively, seat and back when in open position and a top flush sealing cover or roof when in closed position.

6. In a convertible body, a forward seating space and permanent integral seats in said space and a side door for the same, a rear seating space permanently inclosed on the sides and rear, a built-in passageway from the forward seating space to the rear seating space, a shiftable member adapted to form a deck-piece for said rear space or a seat within the permanent walls, a door to close the passage to the rear space in conjunction with said shiftable member when forming a deck.

7. An automobile body comprising two fixed front seats, a passage-way between the same leading to a rear storage and seating space substantially the full width of the front seats, a transverse articulated seat within said rear space and side walls to said space coöperating therewith, whereby in articulated position said rear seat constitutes a deck cover for said rear seating space engaging the top edge of the side walls, and an articulated closure adapted to close the passage-way between the front seats.

8. In an automobile body, a rear seating space substantially the full width of the body with permanent rear wall and sides contiguous with the back of the front seats, a transverse seat in the rear of said space, means whereby said seat is supported to articulate into another position and coöperating permanent sides on said seating space, whereby in said second position, the base of said seat will form a deck piece for said space.

9. An automobile body comprising a rear seating space having permanent rear and side walls and occupying the full width of the body, a movable transverse seat within the space confined by said walls, having pivotal connections at either end within said walls whereby it may be articulated into a position to form a flush cover between the side walls, and a back for said seat having pivots at its end whereby it may be supported to constitute a back or pivoted to a position to form a flush deck between the side walls to completely inclose said rear seating space, in conjunction with a front wall constituting the back of the front seats with a movable section affording access from the front to the rear space when closed, or in the alternative to close said front wall.

10. A four-seated convertible body for automobiles, comprising two permanent front seats, permanent side walls extending contiguously from the back walls of said seats and permanently inclosing a rear space, a two-section cover for said rear space each section being pivoted at its ends on the inside of the permanent side walls, and when in closed position constituting a rearwardly-downwardly extending flush deck from backs of the front seats, and said sections when pivoted to a reverse position constituting, respectively, seat and back for said open rear space and a permanent passageway giving access to said rear space.

11. A convertible automobile body having front seats abutting a permanent transverse partition, a passage in said partition, side walls extending rearwardly from said permanent partition and having their combing or top downwardly sloping from said transverse partition, a permanent deck on the extreme rear of said body, a well between said transverse partition and the rear permanent deck, two transverse sections pivoted each independently at its ends to the inside of the walls of said well, to constitute in one position a flush contiguous deck rearwardly sloping from said partition to the permanent rear deck, and in the other position respectively seat and back in said well.

12. An automobile body comprising a forward seating space, and a rear space convertible for storage or seating, permanent side walls on said rear space, a deck-piece and means movably connecting the same within said space to convert said piece into a back, a second deck-piece and means movably connecting the same to permit converting said piece into a seat within said rear space, offsets in the lateral walls of said rear space whereby said seat-piece may be shifted between said walls and when constituting a deck-piece overlapping the adjacent edges of said side walls.

13. An automobile body comprising a rear seating space, side walls for said space forming an opening with a portion having a restricted laterally-extending portion and a relatively greater lateral-extending portion, a shiftable seat and means movably connecting the same within said body whereby said seat may be shifted through said space of relatively greater lateral extent and whereby when shifted it will engage and form a deck-piece covering the relatively laterally restricted portion of said opening, and an articulated member adapted to form a deck-piece for the wider portion of said opening, and means of access from the forward portion of said body to shift said seat deck-piece.

In witness whereof, I have signed my name to this specification, in the presence of two subscribing witnesses, this 13th day of October 1916.

JOSEPH A. ANGLADA.

Witnesses:
J. M. SEALY,
J. W. ANDERSON.